310-13 SR SEARCH ROOM

FIP8502 OR 3,109,113

ELECTROMECHANICAL ENERGY CONVERTER USING A FLEXIBLE LOOP ARMATURE

Filed May 3, 1960 4 Sheets-Sheet 1

INVENTOR
JACQUES HENRY-BAUDOT
BY Kemon, Palmer, Stewart & Estabrook
ATTORNEYS

INVENTOR.
Jacques Henry-Baudot
BY Kemon, Palmer, Stewart & Estabrook
ATTORNEYS.

INVENTOR
JACQUES HENRY-BAUDOT
BY Kenon Palmer Stewart & Estabrook
ATTORNEYS

INVENTOR.
Jacques Henry-Baudot
BY Kemon, Palmer, Stewart
& Estabrook
ATTORNEYS

United States Patent Office 3,109,113
Patented Oct. 29, 1963

3,109,113
ELECTROMECHANICAL ENERGY CONVERTER USING A FLEXIBLE LOOP ARMATURE

Jacques Henry-Baudot, Antony, France, assignor to Printed Motors Inc., New York, N.Y.
Filed May 3, 1960, Ser. No. 26,620
Claims priority, application France May 13, 1959
16 Claims. (Cl. 310—13)

This invention relates to electromechanical energy converters and, more particularly, to such converters which may, for example, be alternating-current or direct-current motors or generators, and are capable of continuous displacement or rotation and which utilize displaceable members or armatures having printed-circuit conductors, such as plated or etched conductors. Such electromechanical energy converters are described and claimed in a copending application Serial No. 800,254, filed March 18, 1959, by Robert P. Burr.

The object of the invention is to further improve the structures of such electromechanical energy converters, more particularly with a view of better adapting such converters to the drive of information bearing tapes, ribbons, films and the like.

Explanation of the features of the devices according to the invention will be given with reference to the accompanying drawings, wherein:

FIGS. 1 to 4 respectively show side views in partial cross-section of D.-C. converters making use of a mesh-type of printed winding;

FIGS. 5 and 6 respectively show examples of embodiment of such mesh-type windings;

Figures 14, 15, 16, 17, 18, 19A, 19B, 19C, 20A, 20B, 20C:
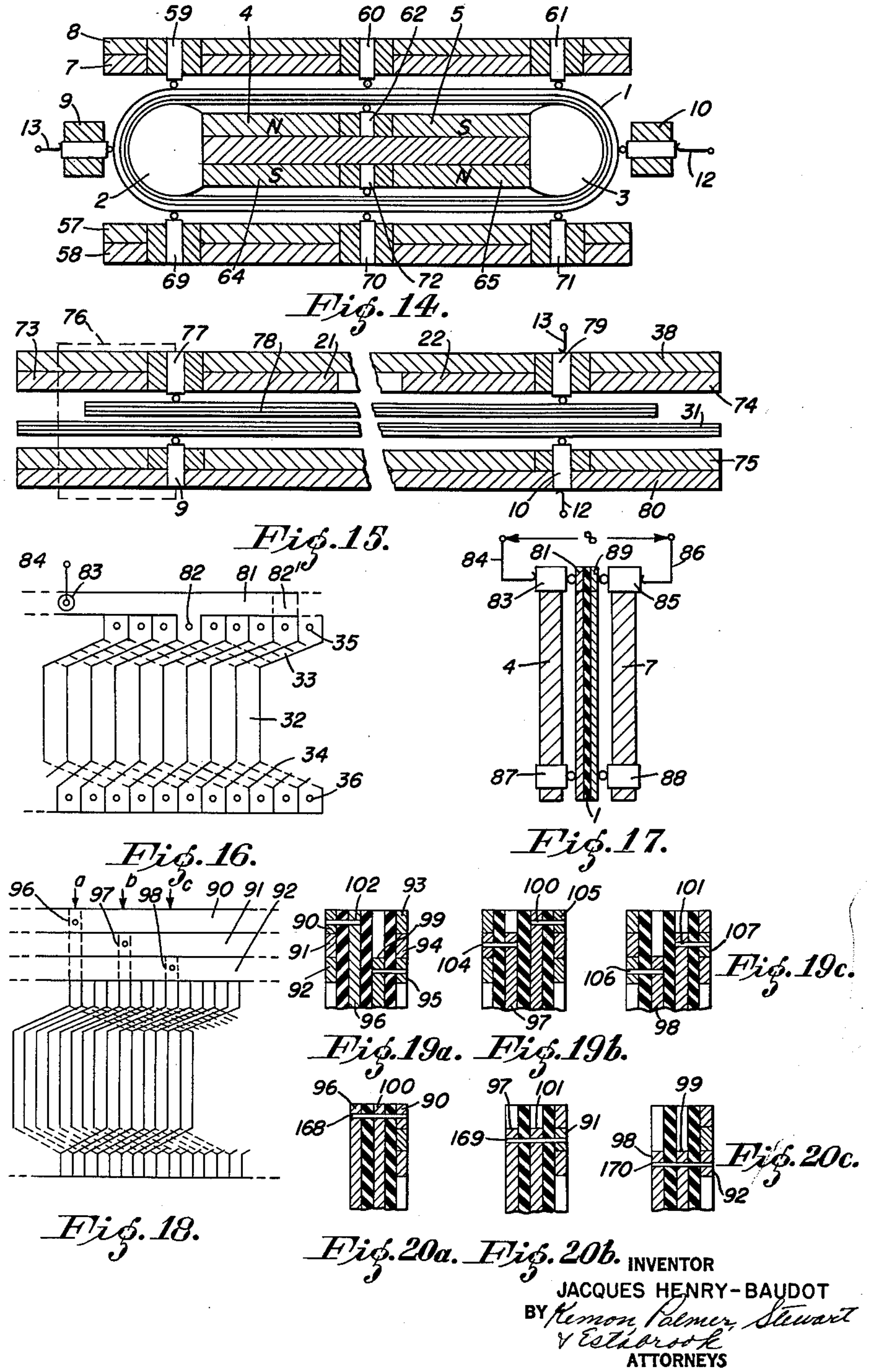
FIG. 14 shows a side view in partial cross-section of a D.-C. converter using a series-wave winding.
FIG. 15 shows a D.-C. converter according to the invention, including a winding for compensating the armature reaction.
FIG. 16 shows a partial top view and FIG. 17 shows a partial cross-section view of an A.-C. single-phase energy converter according to the invention.
FIG. 18 shows a top view of part of a three-phased winding for an A.-C. converter according to the invention.
Figure 25:
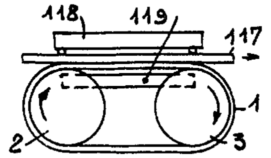
Figure 26:
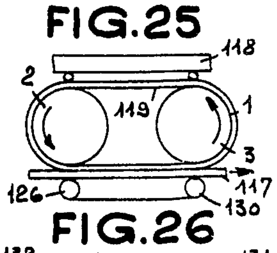
Figure 27:
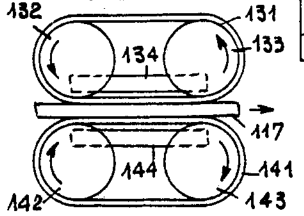

FIGS. 19*a*—19*b*—19*c* show partial cross-section views of FIG. 18, disclosing a first manner of establishing the phase interconnections in such a machine;

FIGS. 20*a*—20*b*—20*c* show partial cross-section views of FIG. 18 disclosing a second manner of establishing the phase interconnections in the machine;

FIGS. 21 to 24 show partial views of machines according to the invention for their use as tape drivers; and FIGS. 25 to 27 show side views of machines intended for such a drive of information tapes.

Figures 1, 2, 3, 4:
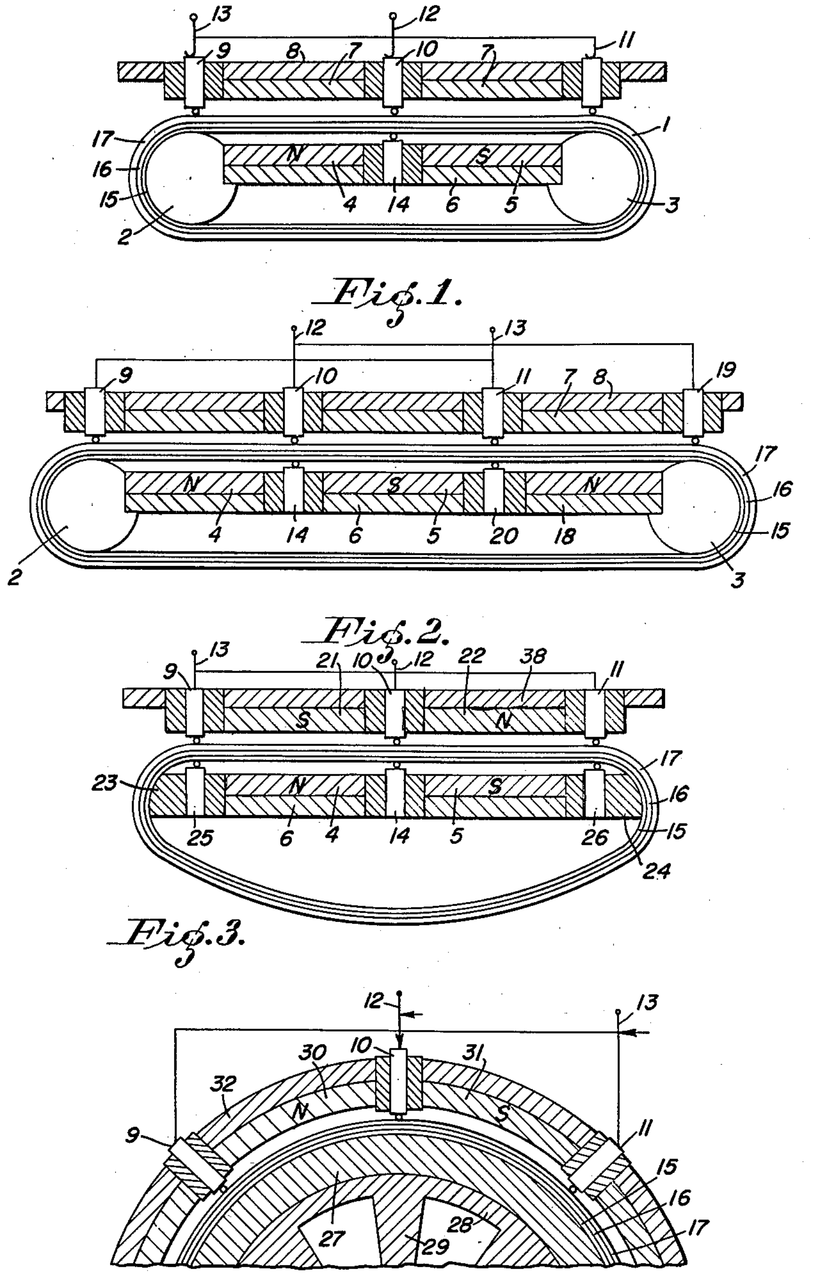

The machine of FIG. 1 comprises a closed loop member 1, made of an insulating flexible belt 16 over the faces of which have been intimately secured the two half-turn sets of conductors 15 and 17 of turn progressing winding of the general mesh pattern kind. The loop is carried over drums 2 and 3 and passes through an elongated airgap of a magnetic inductor structure. The looped winding constitutes the armature of such a machine.

The inductor part of the stator is made of two permanent magnets 4 and 5 having opposite magnetic polarities arranged along the path of the airgap. They are secured to a magnetic plate 6 acting as a yoke therefor if needed; if not, the plate 6 does not need to be of a magnetic material. On the other side of the airgap is shown a magnetic yoke plate 7 secured to a base plate 8. Between the magnets passes a guide member 14 having a roller at its end in contact with the armature. The plate 7 carries three brushes 9, 19 and 11, pressing against the part 17 of the winding and spaced apart by one polar span in the machine. As shown, in FIG. 1, the length of the armature is equal to six polar steps or spans. As only one pair of inductor poles are provided, four out of six of the polar spans of the windings are not active but introduce an electrical resistance which is in parallel with the useful resistance of the winding 1, between the brushes. Since the two brushes 9 and 11 on either side of the brush 10 are interconnected to the same terminal 13, and the brush 10 is connected to the terminal 12, the brush arrangement, if not providing the mere short-circuiting of the inactive part of the armature, at least ensures a substantial reduction of the action of such a parasitic resistance in the winding.

When, as in FIG. 2, the machine comprises an odd number of actual inductor poles, three in this example, pole 18 being added to poles 4 and 5 and the winding armature being of eight polar spans in length, two sets of brushes are provided, such as the pairs 9—11 and 10—19 in FIG. 2, each set being connected to an electrical terminal. The magnetic asymmetry is then compensated for by the supply symmetry but of course the efficiency is increased by the increase of the number of active polar spans in the armature. This is all the more important in that, in most applications and for other reasons, the loop armature must span a high number of polar steps.

Instead of providing drums for carrying the armature it may suffice in some cases, as shown in FIG. 3, to merely guide an otherwise unsupported armature near the ends of the airgap. The guides are shown at 25 and 26 and the armature slides over the rounded parts 23 and 24 of said guides.

In FIG. 3, it is additionally shown that the magnetic yoke may be replaced, when required, by further magnets such as 21 and 22 on a base plate 38, which may be of magnetic material itself. The polar faces of 21, 22 are opposite to those of 4, 5 in their magnetic polarities.

Finally, coaxial structures may be derived from the above described one, as shown in FIG. 4, by merely supporting the flexible armature by a cylindrical magnetic yoke 27, said yoke being carried by a hub 28 having radial arms 29. The stator member is tubular and comprises at least one pair of shaped poles 30 and 31 secured to a curved carrier plate 32. The angular coverage of the inductor may be expanded as much as needed and up to the complete circumference. The brush arrangement may be similar to those above-described, at 12 and 13 are shown the electrical terminals for the connections of such brushes.

Figures 5, 6, 7, 8, 9, 10, 11, 12, 13:
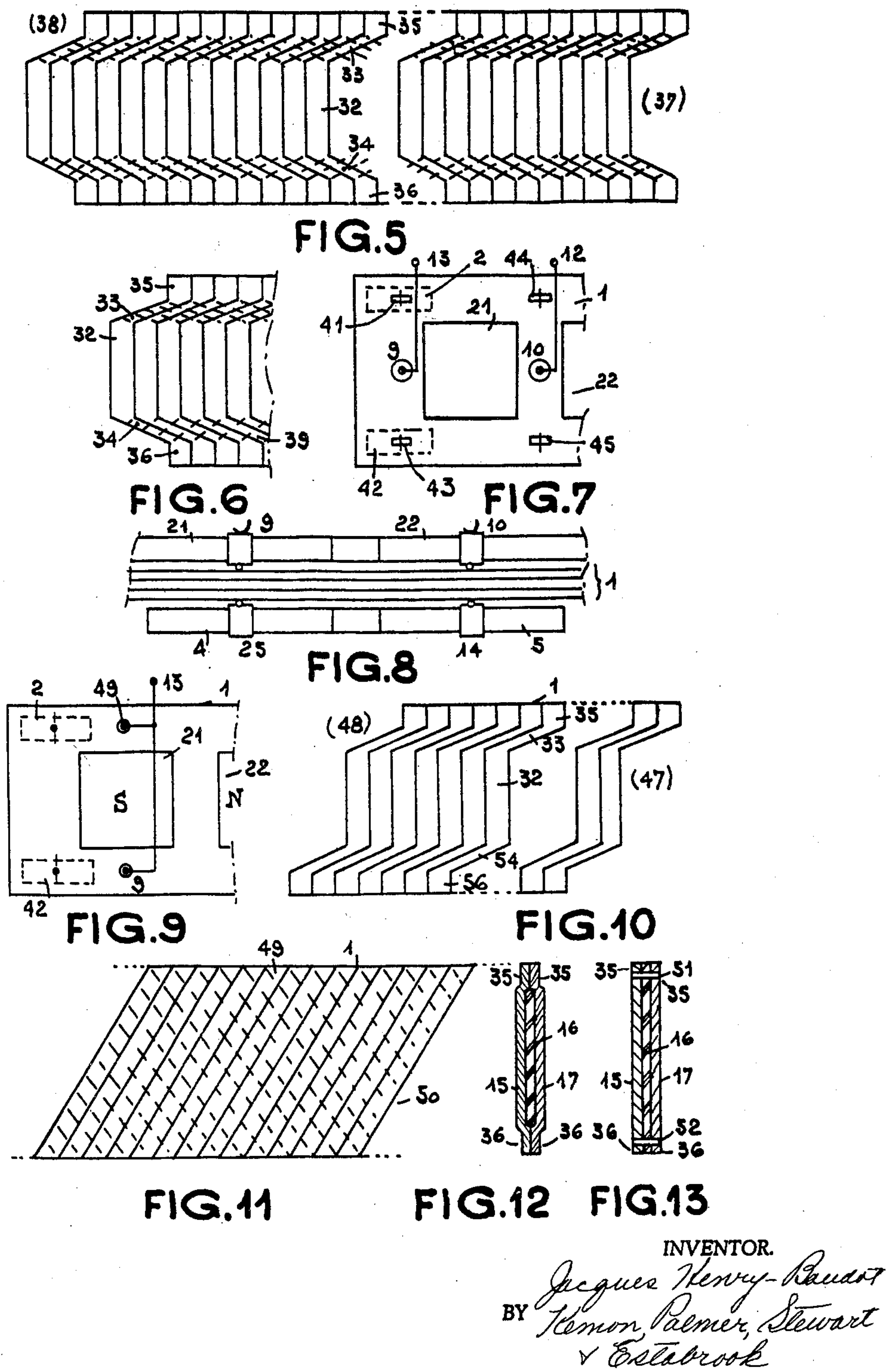
FIG. 7 is a top view of part of such converters showing to the arrangement of the brushes therein.
FIGS. 8 and 9 show lateral and top partial views of another brush arrangement for such converters.
FIGS. 10 and 11 show two examples of series-wave type of windings for machines according to the invention.
FIGS. 12 and 13 show two examples of arrangement of the face-to-face connections in such kinds of windings.

FIG. 5 shows a winding pattern developed in a flat plane for the armature 1. The pattern is seen from one face of the belt armature, the solid lines delineating the conductive parts and denoting the spacings or gaps between the flat conductors. The inclined broken lines show the delineations of the inclined end portions of the conductors on the rear face of the armature. The transverse portions 32 of the conductors being in due registration from one face to the other one of the insulating belt. Each one of said transverse portions is extended by slanted ones 33 and 34 (these parts may be curved if desired) defining the step or span of the mesh pattern of the winding. Part 33 ends on a terminal 35, part 34 on a terminal 36. In FIG. 5 the series of terminals 35 and 36 are relatively shifted from one edge to the other one of the armature, consequently the patterns of the faces are not identical. Such a lack of identity may be compensated for, as shown in FIG. 6, by modification of the slanted portions of the conductors 34 (on the shown face) and 39 (on the opposite face) so that the brush arrangement for cooperation on such terminals may be facilitated, when the said arrangement is made according to FIG. 9.

In FIG. 5, the cuttings of the ends of the armature are shown at 37 and 38 before the armature is made as a loop. Such cuttings follow the edges of conductors of half-turns on one face of the insulating belt. Consequently, by bending the ends of the member upwards (from the plane of the drawing) and bringing the cut ends together for completing the loop, it is easy to see that the soldering will only be made on the exposed face of the loop at that place of connection between the conductor parts to be electrically interconnected on that face and from these edges.

Each face then carries a repetitive series of half-turns of the winding and these half-turns must be interconnected from face to face so as to complete the pattern of mesh winding. Such interconnections are made at the terminals 35 and 36. Two main methods of establishing such connections may be used. The first as shown in FIG. 12 consists of having these terminals extend outside the edges of the insulating carrier and soldering or brazing them together in pairs from face to face. The second method, FIG. 13, consists of providing the interconnections through the insulating carrier, as shown at 51 and 52, by means of small tubular rivets or metallisations of holes through the terminals and the insulator.

The brushes such as 9 and 10 may engage the transverse parts 32 of the conductors, as shown in FIG. 7. They are in such case mounted in the spaces between the polar pieces of the inductor such as 21 and 22. In this diagram, guiding rollers such as 41 and 43 are shown for cooperating with the drums 2 and 42 supporting the armature and auxiliary rollers such as 44 and 45 may further be provided for better guiding the armature. Those additional rollers cooperate with other ones, not shown, on the other side of the armature.

In another arrangement, FIG. 9, pairs of brushes such as shown at 9 and 49 are provided for pressing on the rows of terminals at the edges of the armature. The brushes of each one of such pairs are electrically connected to the same electrical terminal of the machine, 13 in FIG. 9. The transverse axis of the pairs of brushes coincide with an axis of poles in the inductor of the machine. The coincidence is exact when the winding pattern is such as shown in FIG. 6. The brushes are laterally shifted with respect to the longitudinal axis of the structure as shown in FIG. 8 which shows part of the inductor structure.

The winding may be made of the series-wave type, as shown in FIG. 10. The step is preserved from FIG. 6 to FIG. 10 but in the pattern of FIG. 10 the directions of slanting of portions of conductors such as 54 and 56 are reversed with respect to the directions of the corresponding parts 33 and 35 in FIG. 6. Then, a specially simple pattern may be obtained as shown in FIG. 11 by making the half-turns conductors as mere slanted bands from edge to edge of the insulator belt; the degree of slanting determines the winding step or polar span of the arrangement. Such bands are shown at 49 on one face (solid line delineation) and 50 on the other face (broken line delineation). Before it is looped, the armature as in the form of a flat tape with bevelled ends following the delineation of end conductors, so that no soldering on both faces is to be made, according to the scheme described with respect to FIG. 5.

FIG. 14 shows a machine according to the invention and comprising a series-wave winding. In this example, there are two pairs of magnetic poles, 4—5 and 64—65, which together with their respective yokes 7 and 57 supported by mounting plates 8 and 58 form two air gaps or ducts through which passes the closed loop winding 1. The belt is guided by sets of guide members 59—60—61 and 69—70—71 outside the air gaps and guides 62, 72 in the inner members of the stator structure. The drums 2 and 3 support the belt 1. The brushes, of which only one pair 9 and 10 is needed for a series-wave winding are illustratively shown outside the air gaps and connected to terminals 13 and 12 as it suffices that they are spaced apart by an odd multiple of the polar span in the winding. In FIG. 14, the belt presents six polar spans.

In D.-C. machines according to the invention, it may be of advantage to compensate for the reaction of the armature. As previously disclosed by applicant, co-pending application Ser. No. 3,770, filed January 21, 1960, such a compensation may be obtained by means of a further printed winding of identical pattern as the armature winding and facing the armature in the air gap, said windings being interconnected so that the electrical current from the armature passes through the compensating winding in a reverse direction. In machines according to the present invention, such a scheme is useful but the span of the compensating winding is reduced to the span of actual poles. In FIG. 15, for instance, four magnetic poles are shown 73—21—22—74 (other poles may be provided between them) and a yoke 38 carries the magnets. On the other side of the air gap is shown a magnetic yoke 75 carried by a plate 80. The compensating winding is shown at 78 and spans from about the mid-plane of pole 73 to about the mid-plane of pole 74. It is of same pattern as the winding of the belt 1. The brushes are shown at 9 and 10 and the terminals of the compensating winding are shown at 77 and 79. Dot-line connection 76, extending laterally so as not to impede the displacement of the belt, connects the terminal 77 to the brush 9. The terminal 79 is connected to the input terminal 13 and the brush 10, to the output terminal 12. If the pattern is of a mesh kind, lateral conductors are provided for closing the compensating winding loop. If the pattern is of the series-wave kind, this is not required. Of course, in any case, additional brushes and terminals may be provided on and for the windings, as the case may be and as previously described for mesh winding machines.

An A.-C. machine may be derived from the D.-C. one's by mere addition of rings to the windings, and brushes or sliders on these rings for applying or taking-off of electrical current. For instance, a single-phase series-wave winding machine is shown in FIGS. 16 and 17. To the winding are added two conductor strips 81 and 89 "impressed" or printed with the winding proper on the same insulator carrier and on either side of the winding on which two taps 82 and 82[1] are provided at 180 electrical degrees apart (one half of a double polar span). Two sliders or brushes are shown at 83 and 85 connected to terminals 84 and 86, across which is applied the current supply for a motor from which may be obtained output current of a generator. Preferably the brushes are provided at opposite places or points on the armature, FIG. 17. 87 and 88 are mechanical guiding members for the other edge of the winding.

Illustratively, one way consider a three-phase machine. In such a case, as shown in FIG. 18, three conductor strips 90, 91 and 92 are arranged on one face of the concerned winding, a series-wave one. These strips are made on an insulating ribbon which is then secured to the winding belt proper, for instance, as shown in either FIGS. 19*a–b–c* or FIGS. 20*a–b–c*. These figures must be considered as cross-sections of different forms of FIG. 18. Taps 96, 97 and 98 spaced apart by 120 electrical degrees are provided as extensions of ends of the winding conductors at such locations.

When the machine must be capable of correction either in a star-connection or a delta-connection, six connections must be available for such use. In this case, FIGS. 19*a* to 19*c*, another set of conductor strips 93—94—95 is provided on the other side of the winding behind the strips 90—91—92 of FIG. 18. At the places of the taps 96, 97 and 98, the face-to-face connections are omitted between the ends of conductors in the winding, so that the rear face conductors are also provided with extension taps 99, 100 and 101, FIGS. 19*a* to 19*c*. On the other hand, the following interconnections are made between the strips and taps: 102 between tap 96 and strip 90, 103 between tap 99 and strip 95, FIG. 19*a*; 104 between tap 97 and strip 91, 105 between tap 93 and strip 100, FIG. 19*b*; 106 between strip 92 and tap 98, 107 between strip 94 and tap 101, FIG. 19*c*. Strips 90, 91 and 92 may be considered for instance as the three inputs $E_1$, $E_2$ and $E_3$ of the three phases, and strips 93, 94, 95, as the three outputs $S_1$, $S_2$ and $S_3$ of the three phases.

As a simplification the structure may be for a single mode of connection, the delta one. In such a case, FIGS. 20*a* to 20*c*, the taps 96 and 100 in registration are connected by 168 to the strip 90; taps 97 and 101 are connected at 169 to the strip 91; and taps 98 and 99 are connected at 170 to the strip 92. The other strips 93, 94 and 95 are omitted as useless in such a case.

Figure 21:
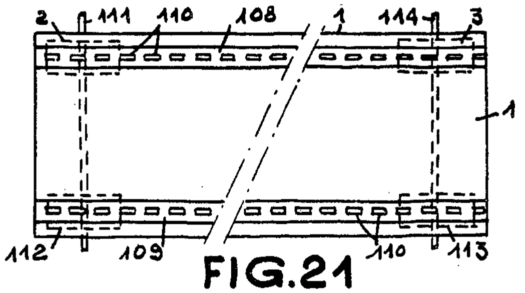
Figure 22:
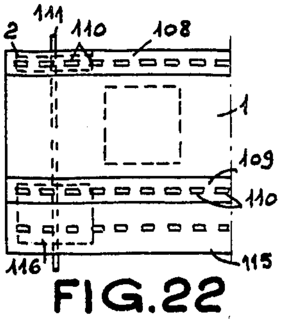
Figure 23:
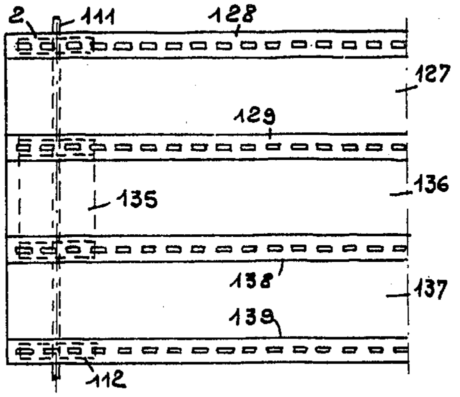

It has been hereinbefore stated that the belt 1 may be carried by drums. Such drums may be sprockets when required, as shown in FIG. 21 for the "drums" 2, 112 and 3, 113, each pair of drums being on the same axle, 111 for the pair 2—112, and 114 for the pair 3—113. The teeth of these sprockets must cooperate with slots in the belt, but of course, the insulator carrier is too thin for slotting, so that additional metallized strips are then provided on the belt, at least on one side as shown at 108, and preferably on both sides, as shown at 108 and 109. The slots are shown at 110 through these metallized strips and the carrying insulator. They do not have any electrical connection with the winding structure proper.

One of the axles 111 and 114 may be used as a mechanical driving member, for a generator, or as a mechanical output member, for a motor, or both for a motor and a generator. As said, machines according to the invention seem to be most appropriate as drives for information bearing tapes, such as perforated tapes, magnetic tapes, kinematographic films and the like.

Of course, the surface of the belt 1 itself offers a first and obvious track for such information members, FIG. 21. But one may prefer not to use the winding belt in such a way so that, as in FIG. 22, one of the drums in each pair, 116 for instance, may be laterally extended at one end for presenting a track 115 outside the airgap of the machine. Only one row of perforations is shown in this track, two rows are also obvious when needed for cooperation with two rows of sprockets on the drum 116. It is also possible, FIG. 23, to provide a "duplicated machine," viz. twin windings on one insulator carrier belt but spaced apart by the width of a track 136, the windings being located at 127 and 137 in such a machine. Reinforcing metallization strips are shown at 128—129 and 138—139 on said winding "tracks" for drive from sprocket drums 2, 112 and 135. Drum 135 is added between 2 and 112 and support for instance the track 136 for the drive of the tape (not shown). The inductor and yoke structure may be single for both windings or, if preferred, separate stator structures may be provided for said windings, though at least the magnetic yoke is provided single for both of them.

Figure 24:
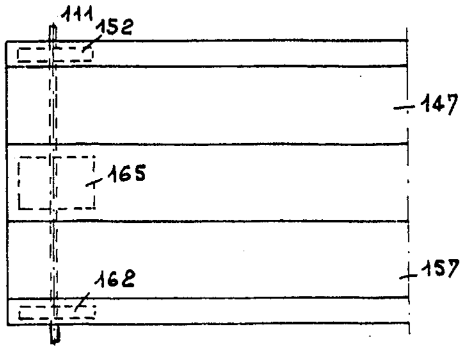

FIG. 24 shows a similar arrangement but without positive drive, only friction drive. The information tape track is provided between the winding tracks 147 and 157 and three smooth drums are shown at 152, 162 and 165 with a common axle or shaft 111.

The information tape may pass through the airgap as shown in FIG. 25 at 117, 118 and 119 being the two parts of the inductor structure delineating the airgap, or else, FIG. 26, the information tape may pass over the other rectilinear portion of the belt 1, being pressed thereagainst by means of a further belt on rollers 126 and 130.

In FIG. 27, the information tape 117 is pressed between two belts 131 and 141 respectively guided over drums 132—133 and 142—143 within an airgap delineated by the members 134 and 144. Each one of the belts 131 and 141 carries a winding of identical pattern.

What is claimed is:

1. An electromechanical energy converter comprising a flexible loop winding member consisting of a thin elongated insulating sheet, a two-face winding of flat conductors intimately adhering over the two faces of said elongated insulating sheet with the winding turns transverse to the length of said sheet, a magnetic inductor structure defining an elongated airgap of smaller length than that of said winding member, means for guiding said member through said airgap, means for translating current flow through said winding, a driving means for driving an information tape from the displacement of said winding member through said airgap, said driving means comprising the combination of said guiding means and said winding member proper.

2. An electromechanical energy converter according to claim 1, wherein said driving means comprises the said winding member and a further winding member passing through the said magnetic airgap, both members being looped in opposite directions outside the said airgap.

3. An electromechanical energy converter comprising a flexible loop member consisting of a two-face winding of flat conductors intimately adhering over the two faces of said insulating sheet with the winding turns transverse to the length of said sheet, a magnetic inductor structure defining an elongated airgap of smaller length than that of said winding member, means for guiding said member through said airgap, means for translating current flow through said winding, and driving means for driving an information tape from the displacement of said winding member through said airgap, said driving means comprises a lateral track extension of said winding member and means for pressing said tape onto said lateral track extension of said member.

4. An electromechanical energy converter according to claim 3, wherein said track is located outside the magnetic airgap of the converter.

5. An electromechanical energy converter according to claim 3, wherein said track is provided between a pair of windings on the same flexible looped member, each winding cooperating with a common magnetic airgap structure.

6. An electromechanical energy converter according to claim 3, wherein said track is provided between a pair of windings on the same flexible looped member, each winding cooperating with a separate inductor structure of same number of magnetic poles, said structures of inductor poles being parallelly set in the converter.

7. An electromechanical energy converter according to claim 6, wherein a common magnetic yoke plate cooperates with both said inductor structures on the other side of the airgap and flexible member and information tape.

8. An electromechanical energy converter according to claim 1, wherein outside the airgap, said flexible winding member is left unsupported.

9. An electromechanical energy converter according to claim 1, wherein the said flexible winding member is supported by a cylindrical yoke plate and the airgap is arcuate along part of the circumference for defining said airgap.

10. An electromechanical energy converter according to claim 1, wherein said flexible member is guided and supported by a pair of drums on either sides of said airgap.

11. An electromechanical energy converter according to claim 10, wherein said tape guiding means comprises the said flexible member proper in a portion outside the airgap and a further flexible member deprived of winding and supported parallel to said winding member on separate drums of parallel axes with respect to the winding member supporting drums.

12. An electromechanical energy converter according to claim 1, wherein said winding is of the series-wave kind and made of half-turn conductors linear and uniformly slanted with respect to the transverse direction of the sheet.

13. An electromechanical energy converter according to claim 1, wherein said winding is of the mesh kind and said current flow translating means comprise at least three brushes spaced along said airgap and alternately connected to D.C. terminals.

14. An electromechanical energy converter according to claim 1, wherein said means for translating current flow comprise collector conductive tracks selectively connected to winding conductors for cooperation with A.C. brushes on said tracks.

15. An electromechanical energy converter according to claim 14, wherein for a multi-phase A.C. winding part at least of said tracks are formed over insulating ribbons and affixed over said flexible member boundaries.

16. An electromechanical energy converter according to claim 1, wherein said means for guiding said winding member comprises brushes for translating current thereto, said brushes being each in two parts applied on the edges of said member and connected together with a current terminal of the converter.

References Cited in the file of this patent

UNITED STATES PATENTS

| | | |
|---|---|---|
| 2,831,131 | Klotz | Apr. 15, 1958 |

FOREIGN PATENTS

| | | |
|---|---|---|
| 714,677 | Great Britain | Sept. 1, 1954 |